(12) United States Patent
Oh

(10) Patent No.: US 10,557,492 B2
(45) Date of Patent: Feb. 11, 2020

(54) CONNECTING STRUCTURE OF BED FRAME

(71) Applicant: Grantec (Xiamen) Co., Ltd., Xiamen (CN)

(72) Inventor: Suk Kan Oh, Xiamen (CN)

(73) Assignee: GRANTEC (XIAMEN) CO., LTD., Xiamen, Fujian (CN)

( * ) Notice: Subject to any disclaimer, the term of this patent is extended or adjusted under 35 U.S.C. 154(b) by 302 days.

(21) Appl. No.: 15/673,431

(22) Filed: Aug. 10, 2017

(65) Prior Publication Data

US 2018/0045235 A1    Feb. 15, 2018

(30) Foreign Application Priority Data

Aug. 11, 2016   (CN) .................... 2016 2 0866653 U

(51) Int. Cl.
*F16B 12/54*     (2006.01)
*A47C 19/02*    (2006.01)

(52) U.S. Cl.
CPC ............ *F16B 12/54* (2013.01); *A47C 19/027* (2013.01); *A47C 19/021* (2013.01); *A47C 19/025* (2013.01)

(58) Field of Classification Search
CPC ....... A47C 19/00; A47C 19/005; A47C 19/02; A47C 19/021; A47C 19/022; A47C 19/025; A47C 19/027; A47C 19/04; A47C 19/12; A47C 19/122; A47C 19/124; A47C 19/126; A47C 17/64; A47C 17/645; A47C 17/70; F16B 12/54

USPC .......... 5/174, 176.1, 200.1, 201, 202, 282.1, 5/285, 286, 400, 111, 114, 116, 117
See application file for complete search history.

(56) References Cited

U.S. PATENT DOCUMENTS

| | | | | |
|---|---|---|---|---|
| 2,590,129 | A | * | 3/1952 | Sawaya ................ A47C 19/126 5/176.1 |
| 4,391,008 | A | * | 7/1983 | Yamaoka ............. A47C 19/005 5/200.1 |
| 4,597,117 | A | * | 7/1986 | Sumner ................ A47C 27/085 5/181 |
| 4,613,999 | A | * | 9/1986 | Franco ................. A47C 27/085 312/140 |
| 5,099,529 | A | * | 3/1992 | Anderson ............. A47C 19/04 5/201 |
| 5,144,706 | A | * | 9/1992 | Walker ................ A47C 19/005 24/DIG. 52 |
| 5,289,600 | A | * | 3/1994 | Schermel ............. A47C 19/005 5/201 |

(Continued)

*Primary Examiner* — Robert G Santos
(74) *Attorney, Agent, or Firm* — Leong C. Lei

(57) ABSTRACT

A connecting structure of a bed frame is provided. The bed frame includes a frame, bed legs, and a bed plank support frame. Two side boards of the frame are provided with a plurality of support portions, respectively. One end of each of a plurality of support members of the bed plank support frame is connected to a corresponding one of the support portions of the side boards. Another end of each of the plurality of support members is connected to a corresponding one of support boards of the connecting spine. The connecting spine is designed as a ⌐-shaped structure, and the upright board is integrally formed with the support boards so that one end of each of the plurality of support members can be directly attached to the corresponding support board of the connecting spine, providing a simple structure and a stable support.

6 Claims, 7 Drawing Sheets

(56) References Cited

U.S. PATENT DOCUMENTS

| | | | | |
|---|---|---|---|---|
| 5,701,653 | A * | 12/1997 | Rupe | A47C 19/021 29/432 |
| 5,983,423 | A * | 11/1999 | Rupe | A47C 19/021 5/200.1 |
| 7,003,822 | B1 * | 2/2006 | Sheehy | A47C 19/005 5/200.1 |
| 7,703,155 | B1 * | 4/2010 | Roberts | A47C 19/005 403/231 |
| 7,739,760 | B2 * | 6/2010 | Wang | A47C 27/082 5/176.1 |
| 7,784,122 | B2 * | 8/2010 | Oh | A47C 19/005 5/174 |
| 7,900,300 | B1 * | 3/2011 | Roberts | A47C 19/005 403/231 |
| 8,006,329 | B2 * | 8/2011 | Oh | A47C 19/005 5/174 |
| 8,091,160 | B2 * | 1/2012 | Jin | A47C 19/126 5/174 |
| 8,122,537 | B1 * | 2/2012 | Roberts | A47C 19/005 403/231 |
| 8,584,277 | B1 * | 11/2013 | Roberts | A47C 19/005 5/1 |
| 8,707,478 | B2 * | 4/2014 | Jin | A47C 19/04 5/112 |
| 8,869,324 | B1 * | 10/2014 | Lin | A47C 19/02 5/200.1 |
| 8,910,327 | B2 * | 12/2014 | Jin | A47C 19/126 5/174 |
| 9,131,779 | B2 * | 9/2015 | Jin | A47C 19/04 |
| 9,474,385 | B2 * | 10/2016 | Oh | A47C 19/126 |
| 10,188,217 | B2 * | 1/2019 | Harrow | A47C 19/005 |
| 10,362,879 | B2 * | 7/2019 | Lee | A47C 19/024 |
| 2005/0235417 | A1 * | 10/2005 | Koughan | A47C 19/005 5/400 |
| 2006/0107456 | A1 * | 5/2006 | Joseph | A47C 17/58 5/2.1 |
| 2008/0109958 | A1 * | 5/2008 | Wang | A47C 27/082 5/279.1 |
| 2009/0025143 | A1 * | 1/2009 | Oh | A47C 19/005 5/201 |
| 2010/0235989 | A1 * | 9/2010 | Jin | A47C 19/126 5/174 |
| 2010/0275372 | A1 * | 11/2010 | Oh | A47C 19/005 5/201 |
| 2012/0246826 | A1 * | 10/2012 | Jin | A47C 19/04 5/400 |
| 2012/0304380 | A1 * | 12/2012 | Jin | A47C 19/126 5/400 |
| 2014/0298583 | A1 * | 10/2014 | Jin | A47C 19/04 5/400 |
| 2014/0325757 | A1 * | 11/2014 | Lin | A47C 19/02 5/400 |
| 2016/0206112 | A1 * | 7/2016 | Oh | A47C 19/126 |
| 2018/0045235 | A1 * | 2/2018 | Oh | F16B 12/54 |
| 2018/0092466 | A1 * | 4/2018 | Harrow | A47C 19/005 |
| 2018/0344040 | A1 * | 12/2018 | Lee | A47C 19/005 |
| 2019/0320804 | A1 * | 10/2019 | Lee | A47C 19/025 |

* cited by examiner

CONNECTING STRUCTURE OF BED FRAME

BACKGROUND OF THE INVENTION

1. Field of the Invention

The present invention relates to a bed frame, and more particularly to a connecting structure of a bed frame.

2. Description of the Prior Art

A bed is an indispensable in our daily life. A conventional bed frame comprises a frame, bed legs, a bed plank support frame, and so on. The frame includes two side boards, a head board and a tail board to form a rectangular frame. Opposing sides of the two side boards are provided with a plurality of support portions to support the bed plank support frame. The bed plank support frame includes a plurality of support members and a connecting spine. Two sides of the bed plank support frame are welded with U-shaped iron pieces corresponding to the support portions of the side boards, respectively. One end of each of the support members is disposed on a corresponding one of the support portions of the side boards, and the other end is inserted in a corresponding one of the U-shaped iron pieces of the connecting spine. To process the connecting spine of this bed frame, it is necessary to weld the U-shaped iron pieces one by one to the side of the connecting spine. The welding process is likely to cause large solder joints, which results in that the U-shaped iron pieces cannot be used. If the solder joints are too small, the strength of the U-shaped iron pieces is insufficient. The structure of the connecting spine is complicated.

Accordingly, the inventor of the present invention has devoted himself based on his many years of practical experiences to solve these problems.

SUMMARY OF THE INVENTION

The primary object of the present invention is to provide a connecting structure of a bed frame having a simple structure and a stable support.

In order to achieve the aforesaid object, the bed frame of the present invention comprises a frame, bed legs disposed at a bottom of the frame, and a bed plank support frame. The frame includes two side boards, a head board and a tail board to form a rectangular frame. Opposing sides of the two side boards are provided with a plurality of support portions, respectively. The bed plank support frame includes a plurality of support members and a connecting spine. The connecting spine includes an upright board and two support boards connected to two sides of a bottom of the upright board. The upright board is integrally formed with the two support boards. One end of each of the plurality of support members is connected to a corresponding one of the support portions of the side boards. Another end of each of the plurality of support members is connected to a corresponding one of the support boards of the connecting spine.

Preferably, the side boards, the head board, the tail board and the connecting spine are respectively divided into two parts and connected together by means of a connecting member.

Preferably, each of the two side boards of the frame is an L-shaped structure having an upright tube and a horizontal tube. The upright tube is integrally formed with the horizontal tube.

Preferably, each of the two side boards is an integrated hollow tube.

Preferably, opposing sides of the horizontal tubes of the two side boards are provided a plurality of corresponding slots. The slots are the support portions. Two sides of the upright board of the connecting spine are provided with apertures corresponding to the slots of the side boards. The respective two ends of the support members are inserted in the slots of the horizontal tube and the apertures of the upright board, respectively.

Preferably, a top surface of the horizontal tube of each side board is provided with the support portions. A top surface of each support board of the connecting spine is provided with a fixing portion. Two ends of a bottom surface of each support member are provided with connecting portions, respectively. The connecting portions, the support portions and the fixing portion are fabric hooks and loop fasteners to mate with each other.

Preferably, each of the connecting portions of the bottom surface of each support member is a stripe of fabric hooks or loop fasteners. The plurality of support members are spaced a predetermined distance from each other. The fabric hooks or loop fasteners of the connecting portions at the respective two ends of the plurality of support members are mated with the fabric hooks or loop fasteners of the horizontal tubes of the side boards and the support boards of the connecting spine.

Preferably, the support portions are fitted to the top surface of the horizontal tube of each side board by fasteners. The fixing portion is fitted to each support board of the connecting spine by fasteners. The two ends of the bottom surface of each support member are fixed to the connecting portions by fasteners, respectively.

Preferably, the fasteners are screws or nails.

The connecting spine of the present invention is designed as a ⊥-shaped structure and the upright board is integrally formed with the support boards so that one end of each of the plurality of support members can be directly attached to the corresponding support board of the connecting spine. Compared to the integrated connecting spine of the conventional bed frame, the connecting spine of the present invention is easy to process, has a simple structure, and is supported in a stable manner because there is no need to weld the U-shaped iron sheet.

DETAILED DESCRIPTION OF THE PREFERRED EMBODIMENTS

Embodiments of the present invention will now be described, by way of example only, with reference to the accompanying drawings.

Figure 1:
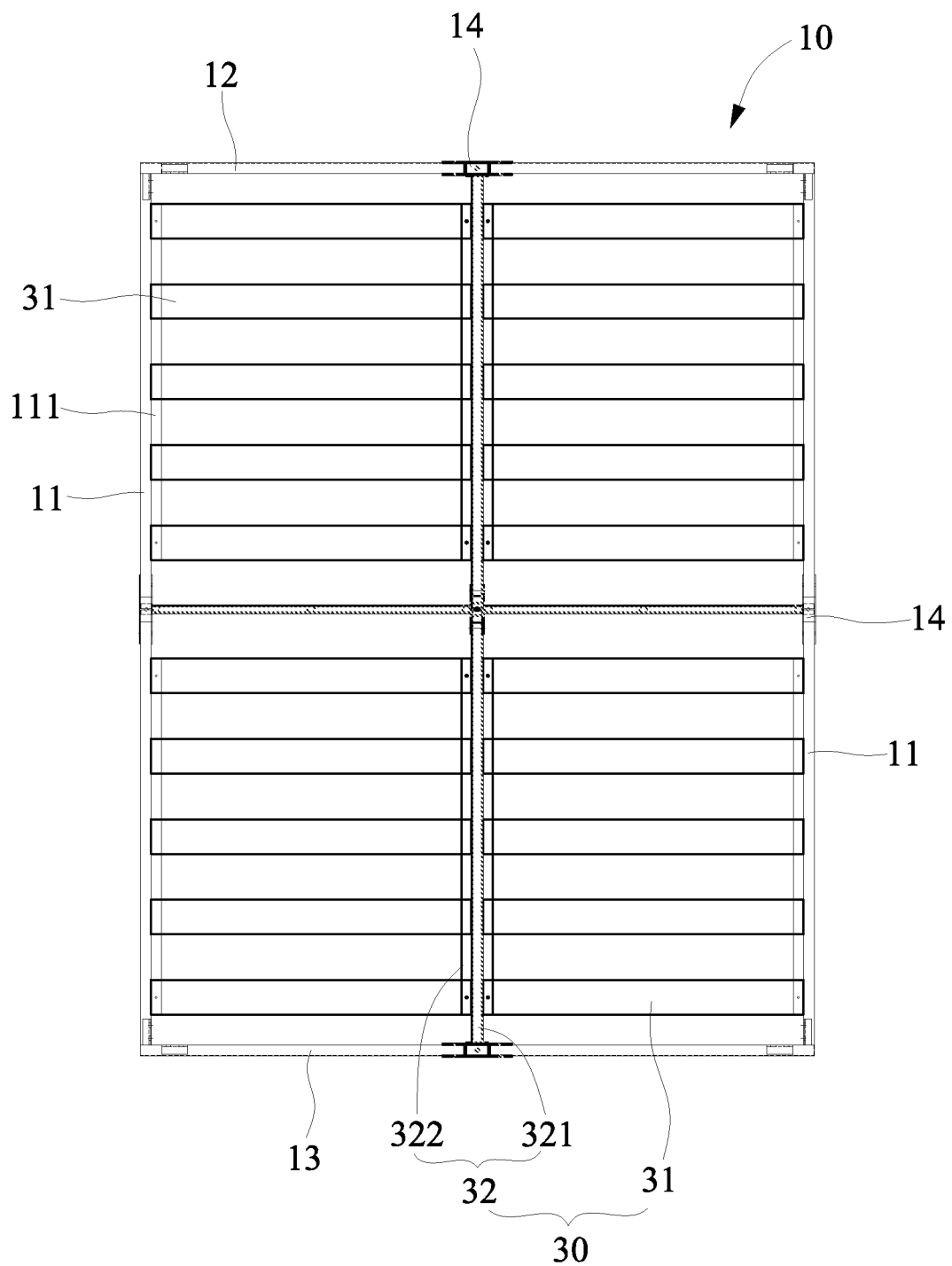
FIG. 1 is a top view of the bed frame of the present invention.
Figure 2:
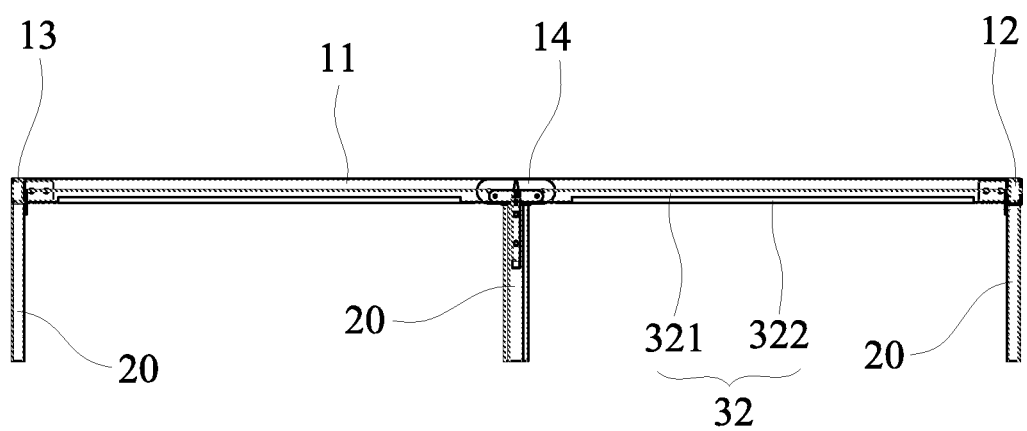
FIG. 2 is a side view of the bed frame of the present invention.
Figure 3:
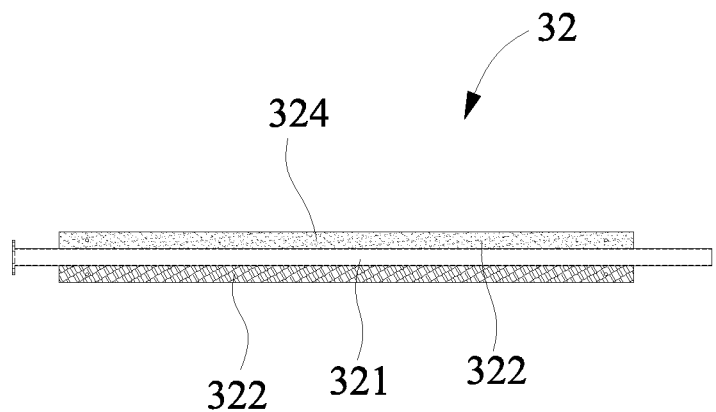
FIG. 3 is a top view of the connecting spine of the present invention.
Figure 4:
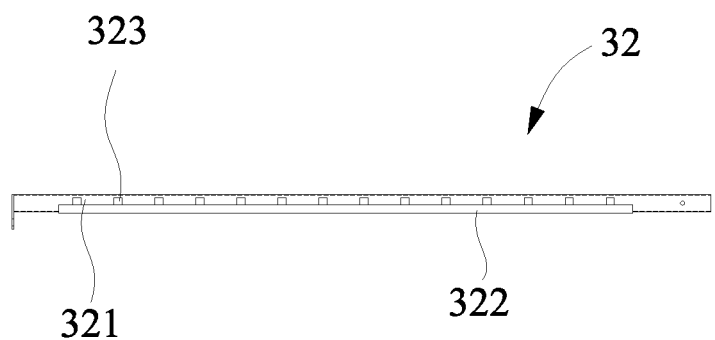
FIG. 4 is a side view of the connecting spine of the present invention.

As shown in FIG. 1, the present invention discloses a connecting structure of a bed frame. The bed frame comprises a frame 10, bed legs 20 disposed at the bottom of the frame 10, and a bed plank support frame 30. The frame 10 includes two side boards 11, a head board 12 and a tail board 13 to form a rectangular frame. Opposing sides of the two side boards 11 are provided with a plurality of support portions 111, respectively. The bed plank support frame 30 includes a plurality of support members 31 and a connecting spine 32. The connecting spine 32 includes an upright board 321 and two support boards 322 connected to two sides of the bottom of the upright board 321. The upright board 321 is integrally formed with the two support boards 322. One end of each of the plurality of support members 31 is connected to a corresponding one of the support portions 111 of the side boards 11. Another end of each of the plurality of support members 31 is connected to a corresponding one of the support boards 322 of the connecting spine 32.

Figure 5:
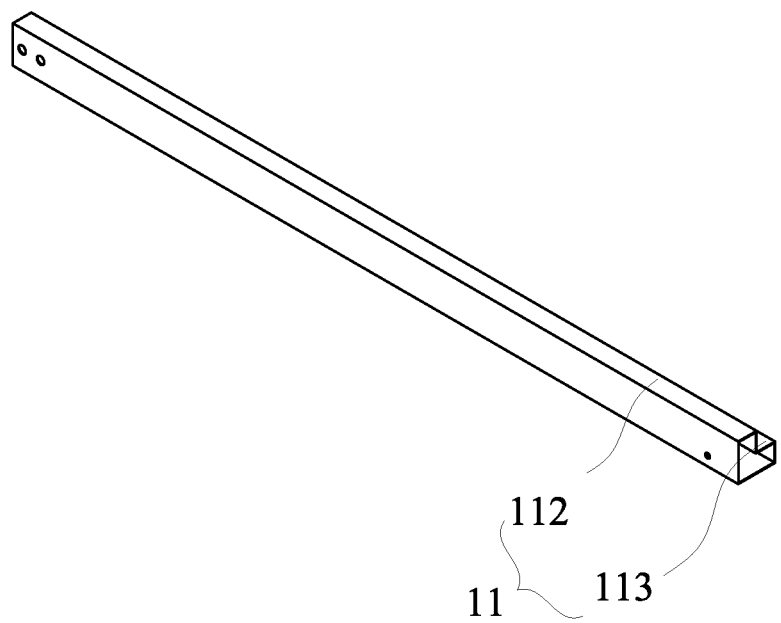
FIG. 5 is a schematic view of a first embodiment of the side board of the present invention.

As shown in FIG. 5, each of the two side boards 11 of the frame 10 is an L-shaped hollow tube which has an upright tube 112 and a horizontal tube 113. The upright tube 112 is integrally formed with the horizontal tube 113, so that the assembly and fixing step of the upright tube 112 and the horizontal tube 113 can be omitted. Since the upright tube 112 and the horizontal tube 113 are integrally formed, there is no phenomenon that the solder joint or the screw is loosened. The structural strength is improved greatly, and the overall strength of the bed frame having the side boards 11 is also enhanced.

Figure 6:
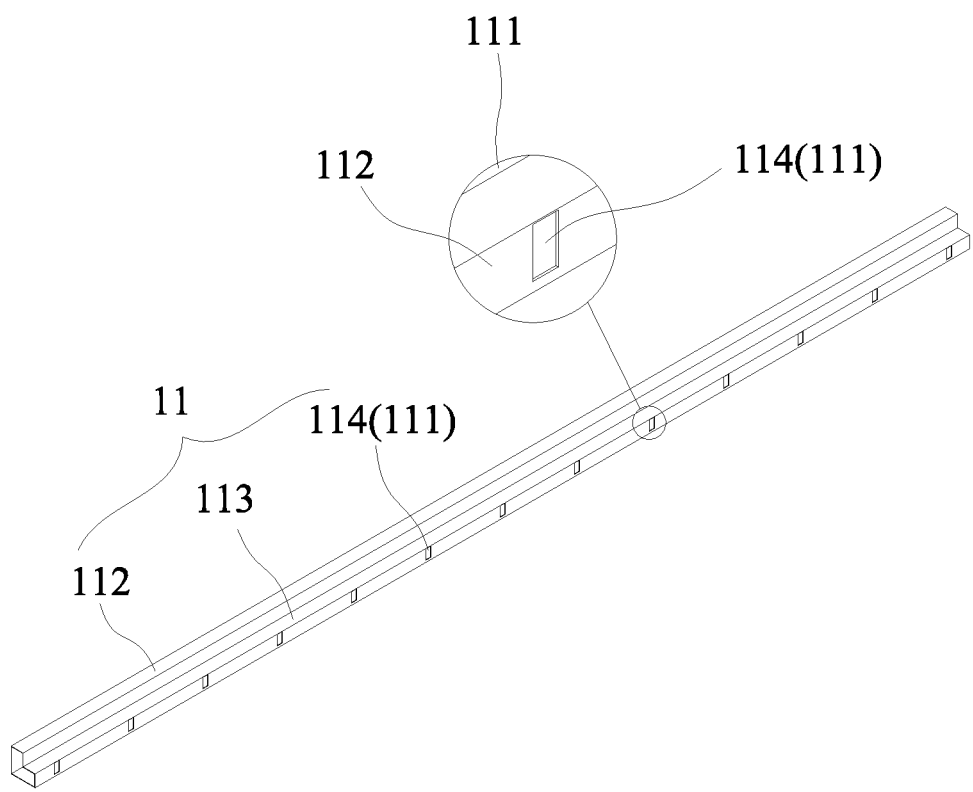
FIG. 6 is a schematic view of a second embodiment of the side board of the present invention.

FIG. 6 is a schematic view of a second embodiment of the side board 11. In order to prevent the plurality of support members 31 of the bed plank support frame 30 placed on the side board 11 from moving, opposing sides of the horizontal tubes 113 of the two side boards 11 are provided a plurality of corresponding slots 114. The slots 114 are the support portions 111. Two sides of the upright board 321 of the connecting spine 32 are provided with apertures 323 corresponding to the slots 11 of the side boards 11. Respective two ends of the support members 31 are inserted in the slots 114 of the horizontal tube 113 and the apertures 323 of the upright board 321, respectively.

Figure 7:
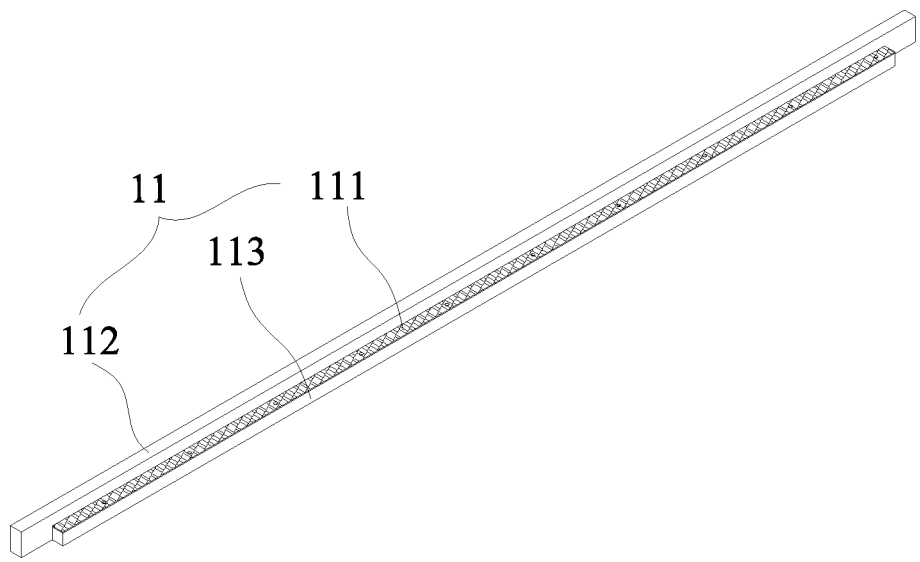
FIG. 7 is a schematic view of a third embodiment of the side board of the present invention.

FIG. 7 is a schematic view of a third embodiment of the side board 11. The top surface of the horizontal tube 113 of each side board 11 is provided with the support portions 111. The top surface of each support board 322 of the connecting spine 32 is provided with a fixing portion 324. Two ends of the bottom surface of each support member 31 are provided with connecting portions 311, respectively. The connecting portions 311, the support portions 111 and the fixing portion 324 are fabric hooks and loop fasteners to mate with each other.

Figure 8:
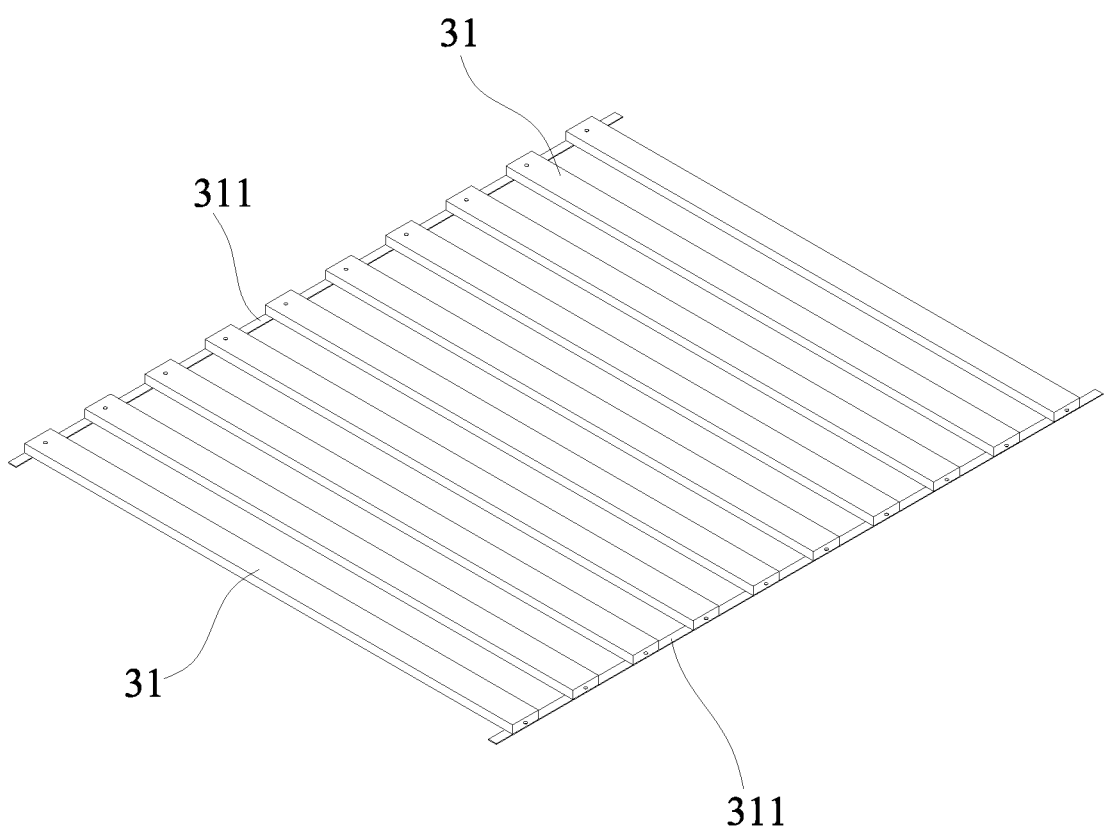
FIG. 8 is a schematic view of the support members in cooperation with the third embodiment of the side board of the present invention.

As shown in FIG. 8, the connecting portion 311 of the bottom surface of each support member 31 is a stripe of fabric hooks or loop fasteners. The plurality of support members 31 are spaced a predetermined distance from each other. The fabric hooks or loop fasteners of the connecting portions 311 at the respective two ends of the plurality of support members 31 are mated with the fabric hooks or loop fasteners of the horizontal tube 113 and the support board 322.

The support portions 111 may be fitted to the top surface of the horizontal tube 113 of each side board 11 by fasteners such as screws, nails, etc. The fixing portion 324 may be fitted to the support board 322 of the connecting spine 32 by fasteners. The two ends of the bottom surface of each support member 31 are fixed to the connecting portions 311 by fasteners, respectively. In this way, when the bed frame is assembled, the plurality of support members 31 can be placed directly on the horizontal tube 113 and the support board 322. Through the fabric looks and the loop fasteners, the support members 31 are fixed to the side boards 11 and the connecting spine 32. Since the fabric looks or the loop fasteners, (i.e., the connecting portions 311) for fixing the support members 31 are soft structures, the plurality of support members 31 can be placed together without being scattered. In order to make the bed frame more easily packaged and transported, the side boards 11, the head board 12, the tail board 13 and the connecting spine 32 are respectively divided into two parts and connected together by means of a connecting member 14.

When in use, the respective side boards 11, the head board 12 and the tail board 13 are assembled to form the frame 10, the bed legs 20 are mounted at the bottom of the frame 10, and both ends of the connecting spine 32 are mounted at the central portions of the head board 12 and the tail board 13, and the support members 31 are mounted on the support portions 111 of the two side boards 11 and the support boards 322 of the connecting spine 32 to complete the bed frame.

The technical features of the present invention is that the connecting spine 32 is designed as a ⊓-shaped structure and the upright board 321 is integrally formed with the support boards 322 so that one end of each of the plurality of support members 31 can be directly attached to the support board of the connecting spine 32. Compared to the connecting spine of the conventional bed frame, the integrated connecting spine of the present invention is easy to process, has a simple structure, and is supported in a stable manner because there is no need to weld the U-shaped iron sheet.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A connecting structure of a bed frame, the bed frame comprising a frame, bed legs disposed at a bottom of the frame, and a bed plank support frame, the frame including two side boards, a head board and a tail board to form a rectangular frame, opposing sides of the two side boards being provided with a plurality of support portions respectively, the bed plank support frame including a plurality of support members and a connecting spine, characterized by the connecting spine including an upright board and two support boards connected to two sides of a bottom of the upright board, the upright board being integrally formed with the two support boards, one end of each of the plurality of support members being connected to a corresponding one of the support portions of the side boards, another end of each of the plurality of support members being connected to a corresponding one of the support boards of the connecting spine; wherein each of the two side boards of the frame is an L-shaped structure having an upright tube and a horizontal tube, and the upright tube is integrally formed with the horizontal tube; wherein each of the two side boards is an integrated hollow tube; wherein opposing sides of the horizontal tubes of the two side boards are provided a plurality of corresponding slots, the slots are the support portions, two sides of the upright board of the connecting spine are provided with apertures corresponding to the slots of the side boards, and the respective two ends of the support members are inserted in the slots of the horizontal tube and the apertures of the upright board, respectively.

2. The connecting structure of the bed frame as claimed in claim 1, wherein the side boards, the head board, the tail board and the connecting spine are respectively divided into two parts and connected together by means of a connecting member.

3. The connecting structure of the bed frame as claimed in claim 1, wherein a top surface of the horizontal tube of each side board is provided with the support portions, a top surface of each support board of the connecting spine is provided with a fixing portion, two ends of a bottom surface of each support member are provided with connecting portions respectively, the connecting portions, the support portions and the fixing portion are fabric hooks and loop fasteners to mate with each other.

4. The connecting structure of the bed frame as claimed in claim 3, wherein each of the connecting portions of the bottom surface of each support member is a stripe of fabric hooks or loop fasteners, the plurality of support members are spaced a predetermined distance from each other, the fabric hooks or loop fasteners of the connecting portions at the respective two ends of the plurality of support members are mated with the fabric hooks or loop fasteners of the horizontal tubes of the side boards and the support boards of the connecting spine.

5. The connecting structure of the bed frame as claimed in claim 3, wherein the support portions are fitted to the top surface of the horizontal tube of each side board by fasteners, the fixing portion is fitted to each support board of the connecting spine by fasteners, the two ends of the bottom surface of each support member are fixed to the connecting portions by fasteners, respectively.

6. The connecting structure of the bed frame as claimed in claim 5, wherein the fasteners are screws or nails.

* * * * *